United States Patent
Zimmermann et al.

(10) Patent No.: US 6,804,213 B2
(45) Date of Patent: Oct. 12, 2004

(54) CORDLESS TELEPHONE SYSTEM

(75) Inventors: Gerd Zimmermann, Eckenthal (DE);
Jörg Huschke, Nürnberg (DE);
Wolfgang Stahl, Eckenthal (DE);
Karine Assmayr-Gillette, Velburg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 764 days.

(21) Appl. No.: 09/729,180

(22) Filed: Dec. 5, 2000

(65) Prior Publication Data

US 2001/0053139 A1 Dec. 20, 2001

(30) Foreign Application Priority Data

Dec. 22, 1999 (EP) .............................................. 99125532

(51) Int. Cl.[7] .................................................. H04Q 7/00
(52) U.S. Cl. ....................... 370/332; 370/436; 370/468; 455/436; 455/450
(58) Field of Search .................................. 370/328, 329, 370/330, 331, 332, 333, 334, 335, 336, 337, 341, 436, 465, 468; 455/422.1, 450, 451, 452.1, 452.2, 453, 436

(56) References Cited

U.S. PATENT DOCUMENTS

| | | | |
|---|---|---|---|
| 5,239,676 A | * | 8/1993 | Strawczynski et al. ...... 455/437 |
| 5,418,839 A | * | 5/1995 | Knuth et al. ................. 455/464 |
| 5,559,842 A |   | 9/1996 | Javitt |
| 5,884,145 A | * | 3/1999 | Haartsen ..................... 455/63.2 |
| 5,963,865 A | * | 10/1999 | Desgagne et al. ........... 455/450 |
| 6,006,092 A | * | 12/1999 | Ward ............................ 455/438 |
| 6,009,332 A | * | 12/1999 | Haartsen ..................... 455/450 |
| 6,295,453 B1 | * | 9/2001 | Desgagne et al. ........... 455/448 |

FOREIGN PATENT DOCUMENTS

| | | |
|---|---|---|
| CA | 2217840 A | 4/1999 |
| EP | 0 490 509 A | 6/1992 |
| WO | 98/09466 A | 3/1998 |
| WO | 98/15146 A | 4/1998 |
| WO | 98/18206 A | 4/1998 |

OTHER PUBLICATIONS

*IEEE Communications Magazine*, US, IEEE Service Center, Piscataway, N.J., vol. 27, No. 4, Apr. 1, 1989, J.E. Abate et al., "AT&T's New Approach to The Synchronization of Telecommunication Networks," pp. 35–45, XP000051483.

*IEEE Transactions on Ultrasonics, Ferroelectrics and Frequency Control*, US, IEEE Inc., New York, vol. UFFC-34, No. 6, Nov. 1, 1987, J.W. Pan, "Present and Future of Synchronization in the US Telephone Network," pp. 629–638, XP000674126.

*Proceedings of the 1993 IEEE International Frequency Control Symposium*, 1993 IEEE International Frequency Control Symposium, Salt Lake City, Utah, USA, Jun. 2–4, 1993, W. Su et al., "A new approach to clock modeling and Kalman filter time and frequency prediction," pp. 331–334, XP000972642.

* cited by examiner

*Primary Examiner*—Bob A. Phunkulh
(74) *Attorney, Agent, or Firm*—Nixon & Vanderhye P.C.

(57) ABSTRACT

A cordless telephone system is described which is arranged to determine interference strength values during a call connection for one or more channel pairs other than the channel pair momentarily carrying a call connection, such that a group of candidate channel pairs for potential channel switching is performed. Then, if a predetermined channel switching condition is met, then a switching is performed to one of the candidate channel pairs from the group.

60 Claims, 5 Drawing Sheets

CORDLESS TELEPHONE SYSTEM

FIELD OF THE INVENTION

The present invention relates to a cordless telephone system and a method of controlling such a cordless telephone system.

BACKGROUND OF THE PRESENT INVENTION

FIG. 4 shows a schematic representation of a cordless telephone system (CTS). A CTS consists of a fixed part (FP) and one ore more mobile stations (MS). The fixed part and mobile stations are each transceiver stations that can establish call connections. The fixed part is typically connected to a public switched telephone network (PSTN), an integrated services digital network (ISDN) or similar network. Typically, the fixed part is the control element in the CTS, i.e. the call connections to the one or more mobile stations are managed and controlled by the fixed part.

Although the present invention shall be explained in the context of a system represented in FIG. 4, it should be noted that the term "cordless telephone system" should be understood broadly, and it is equally well possible that control functions are distributed over the fixed part and mobile stations, or only over the mobile stations, or that control functions are handled by an external entity that can communicate with both the fixed part and the mobile stations. Furthermore, the fixed part may be connected to a land-based network, but it can also be connected to a radio network, e.g. a cellular telephone network.

Cordless telephone systems are typically arranged such that a call connection between the fixed part and a mobile station comprises an uplink channel (from the mobile station to the fixed part) and a downlink channel (from the fixed part to the mobile station). Therefore, a call connection is associated with a pair of channels. The nature of the channels depends on the communication scheme being used, and a channel can be defined by a frequency, by a time slot, by a combination of frequency and time slot, etc. During a call connection the information is transported via transmission blocks.

A basic problem encountered with cordless telephone systems is that of signal interference, more specifically of channel interference, with sources outside of the CTS, due to the fact that there is no possibility of performing cell planning as e.g. in a cellular network. Such sources of interference can be other cordless telephone systems, cellular telephone systems, machines, etc. For example with respect to cellular systems, the well known solution to avoiding interference is to operate the cordless telephone systems in frequency bands that are well outside of the frequency bands used by the cellular network. Although this avoids interference between the CTS and the cellular network, this does not avoid interference with other sources. Also, as a possibility of more efficiently exploiting the frequency bands assigned to cellular networks, it would be advantageous if a CTS could operate in the same frequency bands as a cellular network. This would also have the advantage that the CTS hardware could be similar to the hardware for a cellular network, e.g. the same transceiver equipment could be employed in the mobile stations for a CTS and a cellular network, and the differences could be implemented in the form of software. This would be a very cost efficient solution.

It is in any case necessary to implement a mechanism in cordless telephone systems that allows a switching from one channel pair to another channel pair, if the transmission quality in the momentary channel pair (in the uplink channel and/or the downlink channel) becomes insufficient. Such an operation will be referred to as a switching procedure in the following.

Although the term "handover" is sometimes used for such a switching procedure, it should be noted that such a handover in a cordless telephone system is completely different from any existing handover in a cellular network, e.g. an intercell handover. More specifically, the intercell handover means that the communication between a given base station and a given mobile station is handed over to a different base station, whereas a call connection between the fixed part and a mobile station remains between these two entities in the case of a CTS switching procedure. Taking GSM as an example, the steps leading to an intercell handover consist in letting a mobile station measure the field strength of the control channels (BCCH) of up to 16 neighbouring base station cells, whereupon the 6 best (strongest field strength) are determined and communicated to the base station with which the mobile station is momentarily associated. The base station controller then processes these 6 indications, and uses the information if the channel to the mobile station deteriorates to a point where a handover to another cell becomes advantageous.

In the case of a cordless telephone system (in which there is no cell planning, such that there is no knowledge of the channels being used by neighbouring CTS systems), the problem consists in finding a suitable new channel pair, once the momentary channel pair deteriorates in quality. The known solution consists in performing measurements on channel pairs that are available or accessible to the system, determining a new channel pair that has desirable qualities, and then switching the call connection from the momentary channel pair to the new channel pair. The problem with this approach consists in the possibility that the steps of measuring and determining a new channel pair can take very long if a complete search is performed during the handover phase or the information on which a channel selection is based is not reliable enough if measurements are performed continuously before a handover condition (such as signal deterioration) occurs, such that a noticeable gap appears in the call connection between the fixed part and the mobile station.

OBJECT OF THE PRESENT INVENTION

The object of the present invention is to provide an improved cordless telephone system and an improved method of controlling such a cordless telephone system.

SUMMARY OF THE PRESENT INVENTION

This object is achieved by a cordless telephone system having the features of claim 1, and by a method having the features of claim 22. Advantageous embodiments are described in the dependent claims.

An important aspect of the present invention consists in the fact that the interference strength associated with channel pairs other than the channel pair carrying a momentary call connection is measured irrespective of a handover condition being met, such that a pre-selection of candidate channel pairs for a possible handover is determined and collected in a group. Then, if a predetermined condition is met that initiates a switching to a new channel, then this switching or handover to one of the channel pairs of the group is performed very fast, preferably faster than 50 ms. The group may consist of only one channel pair, or may consist of a plurality of channel pairs. If the group consists of more than one channel pair, then further quick measurements can be made to determine the best channel pair, to which the call connection is subsequently switched. In any case, the handover occurs faster than in the prior art, such that no unwanted gaps appear in the call connection.

In the context of the present application, the term call connection should not be understood as being restricted to voice communication, but shall much rather relate to any type of connection, irrespective of the type of information being transmitted, i.e. also encompasses data connections, signalling connection etc.

According to one general aspect of the present invention, the condition initiating a switching procedure is a deterioration of signal quality in the momentary channel pair (uplink channel and/or downlink channel), such that a switching to one of the members of the group candidates is only performed when the quality of the channel pair carrying the momentary call connection becomes unacceptable. According to a another general aspect of the present invention, the condition for switching to a new channel pair occurs regularly, e.g. after a predetermined number of transmission blocks, such that a continuous channel-hopping takes place. In the second aspect, the occurrence of channel deterioration is avoided by continuously hopping to the best channel pair at that moment. The best channel pair is equal to the above-mentioned group, such that in this case the group only has one member.

BRIEF DESCRIPTION OF FIGURES

The present invention shall be better understandable from the following detail embodiments, which refer to the figures, in which.

DETAILED DESCRIPTION OF THE INVENTION

Figure 4:
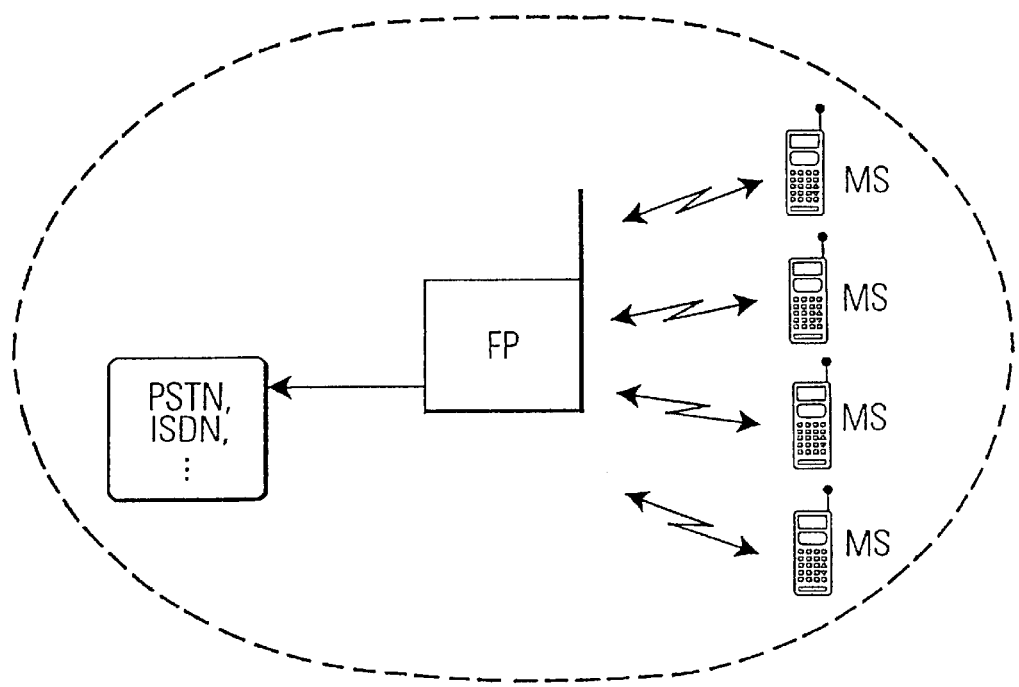
FIG. 4 shows a schematic representation of a cordless telephone system.

The present invention shall now be described on the basis of detailed embodiments. The detailed description of the invention shall be performed in the context of a system as shown in FIG. 4. It will be assumed that all control functions lie in the fixed part, such that information relating to the control of call connections is collected in the fixed part and processed therein. It will also be assumed that each call connection consists of an uplink channel and a downlink channel, there being a fixed and unique association between two channels, such that the choice of an uplink channel always uniquely implicates a downlink channel and vice versa. This can e.g. be achieved by introducing a fixed frequency distance between the uplink channel and the downlink channel. For example, if the downlink channels are selected from a frequency band $F_1$ and the uplink channels are selected from a frequency band $F_2=F_1+\Delta f$ then each downlink channel $f_1$ can be associated uniquely with an uplink channel $f_2=f_1+\Delta f$.

It should however be noted that the present invention is by no means restricted to such a specific cordless telephone system, and that other schemes of arranging channel pairs are possible, and that it is also possible to provide control functions in both the mobile stations and the fixed part, only in the mobile stations, or in an entity separate from both the fixed part and the mobile stations.

It will be assumed that the cordless telephone system of the present invention has a specific set of channel pairs available for call connections between the mobile station and the fixed part. This means that there are e.g. the above-mentioned two frequency bands $F_1$ and $F_2$, where each band is divided into a given number of carriers, i.e. 124. Each carrier comprises 8 time slots and this results in 992 channels. Then, there are 992 channel pairs available to the system in this example, where these channel pairs may coincide or overlap with channels used by cellular systems, or may coincide or overlap with channels used by other sources.

Figure 1:
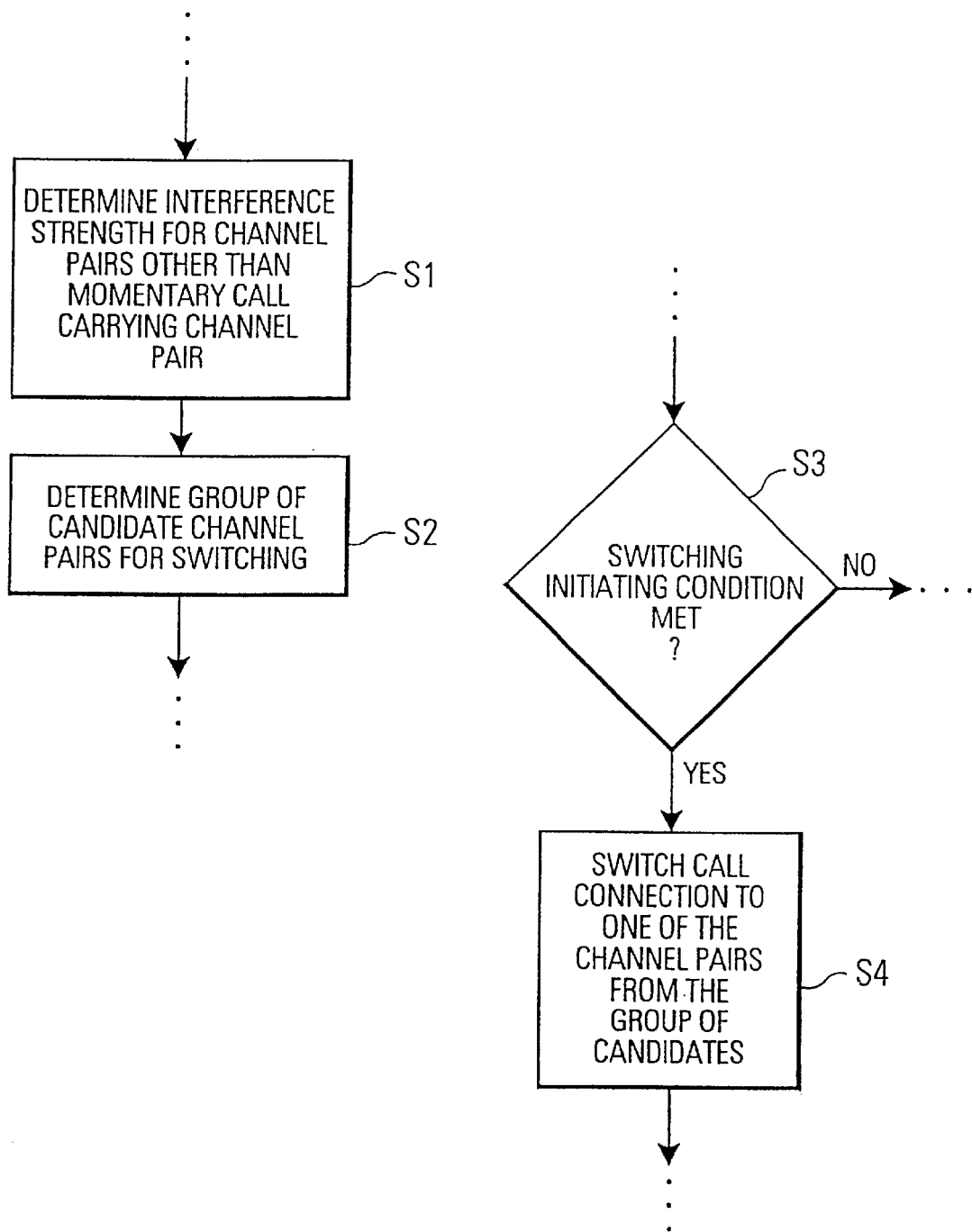
FIG. 1 represents examples of the general method of the present invention.

Now the general concept of the present invention shall be explained in connection with FIG. 1. The steps shown in FIG. 1 are part of a larger control scheme that is not shown. This is indicated by the lines of dots. However, all steps shown in FIG. 1 are only performed during a call connection between the fixed part and a mobile station for controlling said call connection. On the one hand, in steps S1 and S2 the system automatically determines interference strength values for channel pairs other than the momentary call carrying channel pair, and determines a group of candidate channel pairs for switching from the results. It should be noted that these determinations are conducted automatically and for every call connection, irrespective of a switching or handover condition being met (e.g. signal deterioration). Namely, the purpose of steps S1 and S2 is to perform a pre-selection of channel pairs for a possible handover event, such that the handover event to a new channel pair can be accomplished more quickly.

This is shown in connection with steps S3 and S4, where in step S3 it is determined if a condition for initiating a handover or switching is met, and if yes, then the call connection is switched from the momentary channel pair to one of the candidates from the group determined in step S2. Preferably, the processing of step S2 is such that there is only one member in the group, such that step S4 can be performed very quickly. Typically, the switching will be completed in less than 50 ms.

It may be noted that the steps S1 to S4 shown in FIG. 1 can be embodied in many different ways. For example, the determination of interference strength values can be done on the basis of signal quality e.g. bit error measurements or signal strength measurements, or a combination of both. Also, it is possible that the measurements are performed on all available channel pairs (e.g. the 992 channel pairs mentioned above), or they can be restricted to a sub-set of channel pairs determined earlier, e.g. on the basis of measurements performed during the idle mode of the CTS. Preferably, the measurement steps are restricted to a sub-set, where said sub-set is determined on long-term measurements that provide a good estimation of which channels are generally of high quality and which are generally prone to interference.

The criteria used for determining the group in step S2 can also be chosen in accordance with the actual system being used, and in accordance with the individual desires and requirements. For example, if the interference strength is measured on the basis of the signal strength, then it is possible to determine the group as the channel pair where the sum of the signal strength in the uplink and downlink is highest, or where the averaged value fulfills a predetermined condition. It is equally well possible to provide a criterion that places all those channel pairs in the group that exceed a predetermined threshold with respect to a predetermined signal quality (e.g. bit error rate below a certain threshold).

The switching initiating condition of step S3 can be chosen as desired, e.g. on the basis of signal deterioration, or equally well as a periodically re-occurring condition.

Finally, step S4 can be embodied such that the switching to a new channel pair is simply conducted to the only member of the group, as already remarked above. On the other hand, if the group contains more than one member, it is possible that S4 leads to the switching to a channel pair that is ranked highest or best in the group (in accordance with a pre-specified criterion), or step S4 comprises the performance of a new set of measurements on one or more members of the group, in order to 1) reach a final decision on which new channel pair to switch to, and/or 2) to have the most up to date interference information. The latter point is especially important if the switching decision is at least partially based on information resulting from long-term observation (e.g. interference strength measurements conducted over days during the idle phase, which will be explained in more detail further on), because even if a channel pair is measured as being low in interference for a length of time, this does not exclude the possibility that at the moment when a call is to be switched to this channel pair, an unexpected and sudden interference has appeared.

Figure 2:
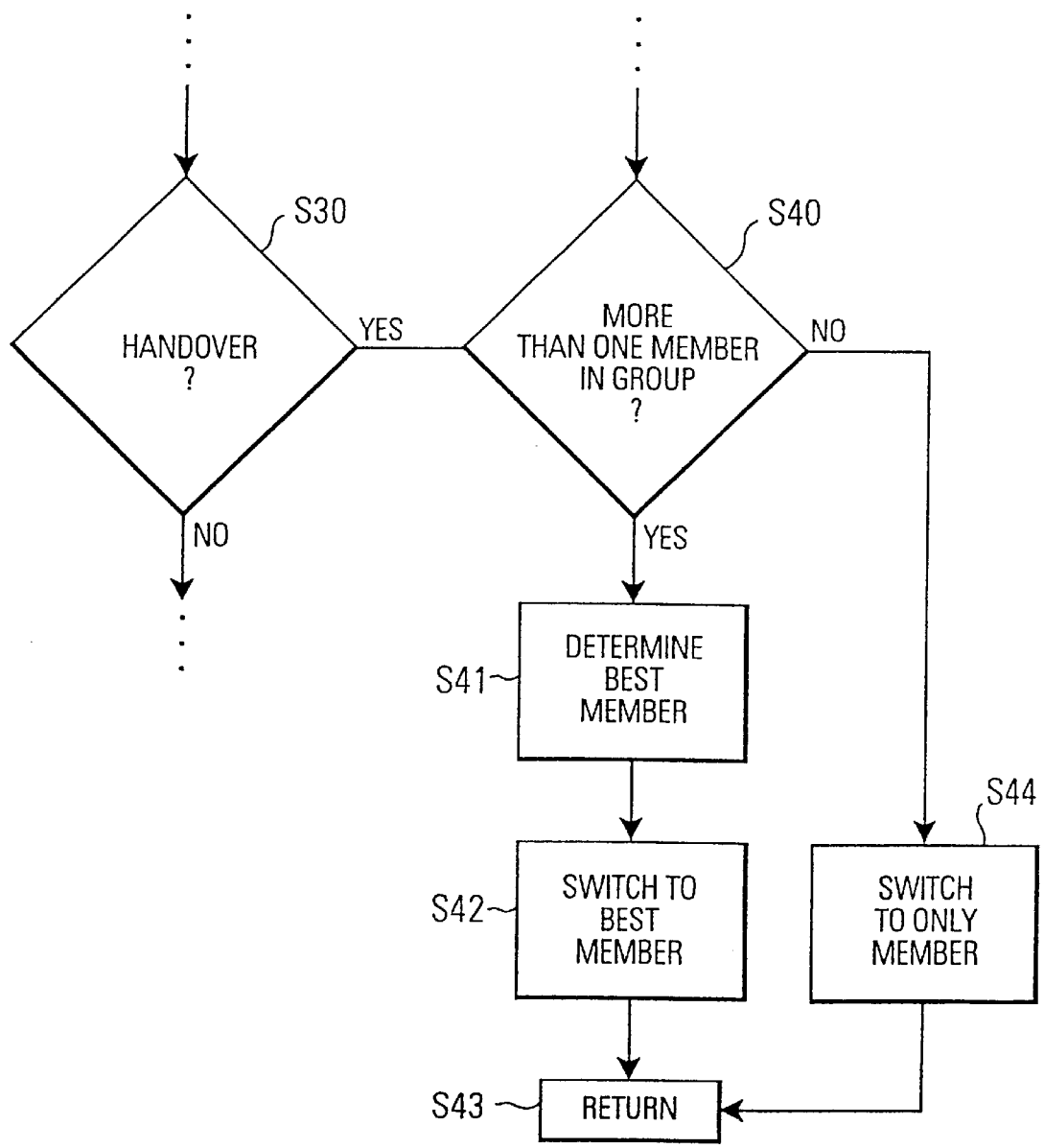
FIG. 2 shows a specific embodiment relating to the above-mentioned first aspect.
Figure 3A:
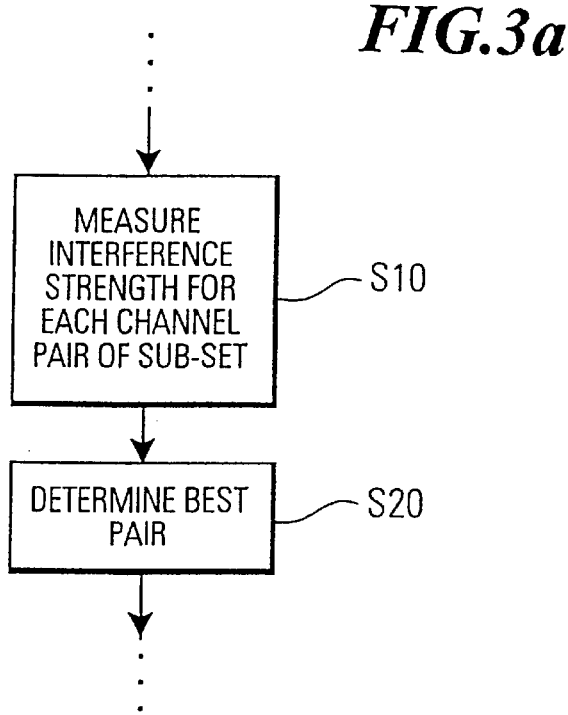
FIGS. 3a and 3b show specific embodiments relating to the above-mentioned second aspect.

Examples of such variations are shown in FIGS. 2 and 3. FIG. 2 shows an arrangement where step S30 (corresponds to step S3 of FIG. 1) determines if a handover condition is met, i.e. if the quality on the uplink and/or downlink of the channel pair presently carrying the call connection has deteriorated below a predetermined threshold. If the handover condition is met, then step S40 determines if there is more than one member in the group, and if there is only one, step S44 performs the switching to this only member. On the other hand, if there is more than one member, step S41 determines the best member, in accordance with a predetermined useful or desirable ranking scheme. Then, step S42 switches to the best member. Finally, the system returns to the normal control in step S43.

Figure 3B:
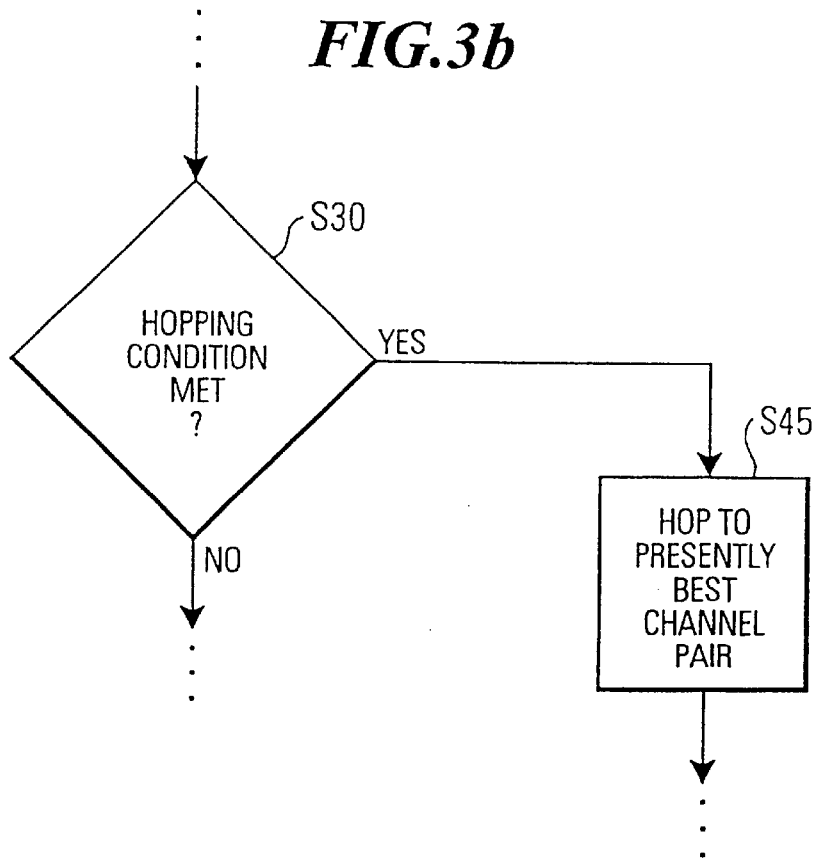

FIG. 3 shows a different condition, where the switching procedure or channel-hopping is performed at regular intervals. In this case, it is preferable that long-term measurements performed during the idle phase (the idle phase is the phase during which there are no call connections between the fixed part and the mobile station) of the cordless telephone system have produced a sub-set of all available channel pairs, for example the 8 channel pairs among the 992 mentioned above, that show the lowest average interference over the predetermined time span, e.g. three or four days. Then, step S20 determines the best pair (in accordance with a pre-specified criterion) of the measured members of the sub-set. In other words, in the embodiment of FIG. 3, the group always only contains one member. Consequently, as shown in FIG. 3b, the switching step S45 simply switches to the best pair specified in step S20. As can also be seen from FIG. 3b, step S30 determines if a hopping condition is met, i.e. if a predetermined time interval has passed, or if a predetermined number of transmission blocks have been sent, such that in the latter case hopping is performed after every sending of said predetermined number of transmission blocks.

One of the advantages of the just described embodiment using continuous channel hopping is the fact that the switching to a new channel pair is initiated by only a few signalling bits, such that no extensive signalling between the fixed part and mobile station are necessary prior to the switching over.

Now a more detailed example of a possibility for determining the group of candidate channels shall be described. During each call connection, short measurements of the received field strength are periodically accomplished for all available channels in the uplink as well as in the downlink. In other words, in this example, there is no sub-set and the determination of interference strength values extends to all available channel pairs. The measurements with field strengths above a certain threshold are marked by setting a flag $f_{i,x}$.

Figure 5:
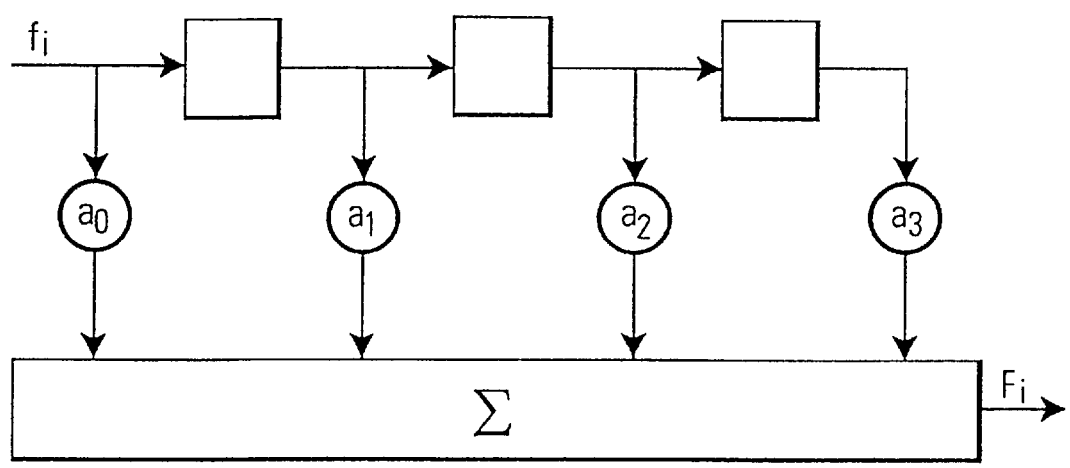
FIG. 5 shows a filter structure used in one embodiment of the invention.

$f_{i,x}=0$ represents that the interference field strength of channel i is below the threshold, and $f_{i,x}=1$ signifies that the interference field strength is above the threshold. The index x stands for UL (uplink) or DL (downlink). The flags are stored and periodically transmitted to the master control unit, e.g. the fixed part. In the master control unit the two flags $f_{i,UL}$ and $f_{i,DL}$ are combined to a new flag $f_i$ by an OR-combination, where $f_i=0$ if $f_{i,UL}=0$ and $f_{i,DL}=0$, and $f_i=1$ otherwise. The flags $f_i$ obtained by consecutive measurements of channel i, are shifted into a digital filter with N filter coefficients $a_k$, with $a_k<a_{k-1}$. In this way, a weighted average of the measurement results is calculated, where later measurements have a greater influence on the output $F_i$ than earlier measurements. The coefficients are preferably set to $a_k=2^{N-k-1}$. Such a filter for determining the weighted outputs $F_i$ is shown in FIG. 5.

The group of candidates for new channel pairs is defined by all channels with an output $F_i$ below a pre-specified threshold. The master control unit selects the new channel cut of this group. If the group contains more than one channel pair, additional measurements can be accomplished in order to check if the interfering field strength is still low enough. These measurements then preferably start with the channel pair having the lowest $F_i$, or—if a separate ordered channel list is available—with the best channel according to this list. The measurements stop if a channel pair with interfering field strength lower than a second threshold is found. Alternatively, the master control unit can always select the channel pair with the lowest value $F_i$ without additional measurements. As already mentioned previously, if the group contains only one channel, no additional measurements are necessary at all.

The above-mentioned example can be varied in a number of ways. For example, it is not necessary that all of the channels available to the cordless telephone system are measured with equal measurement period and within measurement intervals of equal length. It is possible to measure some channels (e.g. channels determined as important with the help of statistical evaluation methods) more often and/or with a longer measurement interval than other channels, to thereby achieve more up-to-date and/or more reliable results.

Also, in order to avoid a ping-pong effect where the call connection is toggled between only two channel pairs, the last n channel pairs used for the same call connection may be excluded from the group of channel pair candidates.

Now a different embodiment shall be described, in which a switching or hopping to new channel pairs is conducted regularly, such that a deterioration of quality is avoided. As a starting point, the cordless telephone system is arranged such that long-term measurements (over several days, e.g. three days) are conducted during the idle phase when there is no call connection between the fixed part and the mobile station, where such a long-term measurement specifies a sub-set of channel pairs that are well suited as call connection carrying channel pairs. In other words, interference strength measurements can be conducted during the idle phase and averaged over a predetermined observation period, e.g. three or four days, and the average interference strength of all available carriers can be used for subsequently ranking channel pairs into a subset during call set-up, by starting with the channel pair having the lowest average interference strength, and a sub-set of e.g. the 8 best or highest ranked channel pairs can be determined. Naturally, it is equally well possible to specify other ranking criteria. Then, during an established call connection, interference strength values are determined for the channel pairs of said sub-set, namely the fixed part measures the uplink channel and the mobile station measures the downlink channel, and the corresponding data is collected in the fixed part. These measurements are performed continuously and irrespectively of any handover conditions. In other words, these measurements are performed automatically and for every call connection.

During each transmission block in uplink direction, the mobile station signals to the fixed part which of the members of the sub-set have achieved the lowest interference strength values, e.g. by transmitting the number of the corresponding downlink channels. The fixed part filters the measurement results by counting how often which channel of the sub-set was measured with lowest interference during the last m transmission blocks. This filter can be realised with the help of two shift registers, which memorize the last m measurement results, i.e. the number of the present best channel that shows the lowest interference. One shift register is used to memorize the numbers of the best channel evaluated in the uplink direction, and one is used to memorize the number of the number of the best channels evaluated in the downlink direction.

The best channel with the highest number of occurrences in both shift registers is used for determining the new channel pair. It is possible that the downlink measurement results can be weighted by multiplying the content of one of the shift registers.

Finally, the decision of the fixed part concerning the new channel pair is signalled to the mobile station in the next downlink transmission block. For example, if the cordless telephone system employs the signalling scheme known from GSM, this could be achieved in the next speech block by using class II bits. If e.g. 8 channel candidates are used, 3 class II bits are sufficient to indicate the new transmission channel to the mobile station. In the uplink direction as well, 3 class II bits would be sufficient to report the best downlink channel out of the predefined set of channels during the last observation period.

It should be noted that the sub-set will generally not be changed during a call connection. However, it is possible to implement a further feature according to which the members of the sub-set can be updated if a high percentage of the channel pair candidates are interfered with as unacceptable interference level. This request to update the candidate list (e.g. to delete a member from the sub-set) is signalled from the fixed part to the mobile station by using a control message (e.g. in the case of the GSM standard a FACCH message) in the downlink transmission.

Although the above examples have been described on the basis of a scheme using carriers and time-slots for defining channels, it should be understood that the invention is applicable to any channel definition scheme.

Although the present invention has been described by way of detailed examples, it is to be understood that these examples only serve to better explain the present invention to a person skilled in the art, and are not intended to restrict the scope. The scope of the invention is much rather defined by the appended claims. Also, reference numerals in the claims are intended for better understanding and also do not restrict the scope.

What is claimed is:

1. A cordless telephone system comprising at least a first transceiver station and a second transceiver station, said system being arranged such that
   a given call connection is carried on a channel pair, said channel pair consisting of an uplink channel from said second transceiver station to said first transceiver station and a downlink channel from said first transceiver station to said second transceiver station, said system furthermore comprising:
   a means for switching from a momentary call carrying channel pair to a new channel pair during a call connection,
   a means for determining interference strength values associated with one or more channel pairs that are available to said system for establishing call connections between said first and said second transceiver stations, said means being arranged to determine interference strength values during a call connection for one or more channel pairs other than the channel pair momentarily carrying the call connection, and
   a means for processing said interference strength values in order to determine a group of one or more candidate channel pairs that serve as candidate channel pairs to which a call connection can potentially be switched,
   where said means for switching is arranged such that, during a call connection between said first and second transceiver station, under a predetermined switching initiating condition, said first and second transceiver stations perform a fast switching procedure from the channel pair momentarily carrying the call connection to a different channel pair from among said group of candidate channels,
   wherein said first transceiver station is arranged to generate first interference data associated with the interference strength on each uplink channel for which a determination of interference strength values was performed,
   said second transceiver station is arranged to generate second interference data associated with the interference strength on each downlink channel for which a determination of interference strength values was performed,
   said processing means is arranged to collate the first and second interference data, and to process said collated data in order to determine said group of candidate channels.

2. The cordless telephone system of claim 1, wherein said channel pairs available to said cordless telephone system overlap or coincide with channels used by a cellular telephone system distinct from said cordless telephone system, where the spatial transmission ranges covered by said cordless telephone system and said cellular telephone system overlap.

3. The cordless telephone system of claim 2, wherein said second transceiver station is mobile station capable of establishing a communication in the cordless telephone system and the cellular telephone system.

4. The cordless telephone system of claim 1, wherein said interference strength values are determined on the basis of the signal quality or the signal strength.

5. The cordless telephone system of claim 1, wherein said system is arranged such that said fast switching is accomplished in less than 50 ms.

6. The cordless telephone system of claim 1, wherein said processing means are provided in said first transceiver station.

7. The cordless telephone system of claim 1, wherein said interference data are interference flags that assume the value zero if the interference strength value on the associated channel is below a predetermined interference threshold, and assume a value of one if the interference strength value on the associated channel is above said predetermined interference threshold.

8. The cordless telephone system of claim 7, wherein said processing means performs an OR operation on said first and second interference flags associated with a unique channel pair, such that a decision flag is generated that assumes the value zero if both the first and second interference flags associated with the pair have the value zero, and assumes the value one otherwise.

9. The cordless telephone system of claim 8, wherein said processing means is arranged to determine a weighted average value associated with a given channel pair on the basis of consecutive values of said decision flag associated with said given pair.

10. The cordless telephone system of claim 9, wherein the weights for newer values of said decision flag are larger than the weights for older values of said decision flag.

11. The cordless telephone system of claim 9, wherein said switching procedure is such that said first and second transceiver station switches from the current receiver channel to the channel having the lowest weighted average value.

12. The cordless telephone system of claim 9, wherein said system is furthermore arranged to determine interference strength values for the channels of said group of candidate channels prior to said first transceiver station and second transceiver station switching to a new channel pair, where the order of said determinations of interference strength values is determined on the basis of the weighted average values, and where the first pair of channels for which one or both interference values lie below a predetermined first threshold is selected as a new channel pair.

13. The cordless telephone system of claim 8, wherein said group of candidate channels is determined on the basis of the weighted average values.

14. The cordless telephone system of claim 13, wherein said group contains those channels for which the associated weighted average is below a predetermined decision threshold.

15. The cordless telephone system of claim 1, wherein said one or more channel pairs other than the channel pair momentarily carrying the call are among a sub-set of all channel pairs available to said system for establishing call connections between said first and second transceiver station.

16. The cordless telephone system of claim 15, wherein said sub-set is defined at the time of call set-up on the basis of interference strength values determined during the idle phase of said first and second transceiver stations.

17. The cordless telephone system of claims 15, wherein, as said predetermined switching initiating condition, said switching procedure is performed at regular intervals.

18. The cordless telephone system of claim 15, wherein said first and second transceiver stations transmit in transmission blocks, and as said predetermined switching initiating condition, said switching procedure is performed each time that a predetermined number of transmission blocks has been transmitted.

19. A cordless telephone system comprising at least a first transceiver station and a second transceiver station, said system being arranged such that a given call connection is carried on a channel pair, said channel pair consisting of an uplink channel from said second transceiver station to said first transceiver station and a downlink channel from said first transceiver station to said second transceiver station, said system furthermore comprising:

a means for switching from a momentary call carrying channel pair to a new channel pair during a call connection, a means for determining interference strength values associated with one or more channel pairs that are available to said system for establishing call connections between said first and said second transceiver stations, said means being arranged to determine interference strength values during a call connection for one or more channel pairs other than the channel pair momentarily carrying the call connection, and a means for processing said interference strength values in order to determine a group of one or more candidate channel pairs that serve as candidate channel pairs to which a call connection can potentially be switched, where said means for switching is arranged such that, during a call connection between said first and second transceiver station, under a predetermined switching initiating condition, said first and second transceiver stations perform a fast switching procedure from the channel pair momentarily carrying the call connection to a different channel pair from among said group of candidate channels, wherein said system is furthermore arranged such that at a given time during a call connection to said second transceiver station, said first transceiver station also determines interference strength values for its momentary uplink channel, and is arranged to initiate said switching procedure if the determined interference strength values lie above a predetermined second threshold, as said predetermined switching initiating condition, and said system is furthermore arranged such that at a given time during a call connection to said first transceiver station, said second transceiver station also determines interference strength values for its momentary downlink channel, and is arranged to initiate said switching procedure if the determined interference strength values lie above said predetermined second threshold, as said predetermined switching initiating condition.

20. A cordless telephone system comprising at least a first transceiver station and a second transceiver station, said system being arranged such that a given call connection is carried on a channel pair, said channel pair consisting of an uplink channel from said second transceiver station to said first transceiver station and a downlink channel from said first transceiver station to said second transceiver station, said system furthermore comprising:

a means for switching from a momentary call carrying channel pair to a new channel pair during a call connection, a means for determining interference strength values associated with one or more channel pairs that are available to said system for establishing call connections between said first and said second transceiver stations, said means being arranged to determine interference strength values during a call connection for one or more channel pairs other than the channel pair momentarily carrying the call connection, and a means for processing said interference strength values in order to determine a group of one or more candidate channel pairs that serve as candidate channel pairs to which a call connection can potentially be switched, where said means for switching is arranged such that, during a call connection between said first and second transceiver station, under a predetermined switching initiating condition, said first and second transceiver stations perform a fast switching procedure from the channel pair momentarily carrying the call connection to a different channel pair from among said group of candidate channels, wherein said system is furthermore arranged such that identification data associated with a predetermined number of receiver channels last used by said first and second transceiver stations is stored, and said predetermined number of channels last used is excluded from said group of candidate channels.

21. A method of controlling a cordless telephone system comprising at least a first transceiver station and a second transceiver station, said system being arranged such that a given call connection is carried on a channel pair, said channel pair consisting of an uplink channel from said second transceiver station to said first transceiver station and a downlink channel from said first transceiver station to said second transceiver station, said method comprising the steps:

determining interference strength values during a call connection for one or more channel pairs other than the channel pair momentarily carrying the call connection, processing said interference strength values in order to determine a group of one or more candidate channel pairs that serve as candidate channel pairs to which a call connection can potentially be switched, during a call connection between said first and second transceiver station under a predetermined switching initiating condition, performing a fast switching procedure from the channel pair momentarily carrying the call connection to a different channel pair from among said group of candidate channels, wherein said first transceiver station generates first interference data associated with the interference strength on each uplink channel for which a determination of interference strength values was performed, said second transceiver station generates second interference data associated with the interference strength on each downlink channel for which a determination of interference strength values was performed, the first and second interference data, are collated and processed in order to determine said group of candidate channels.

22. The method of claim 21, wherein said channel pairs available to said cordless telephone system overlap or coincide with channels used by a cellular telephone system distinct from said cordless telephone system, where the spatial transmission ranges covered by said cordless telephone system and said cellular telephone system overlap.

23. The method of claim 22, wherein said second transceiver station is a mobile station capable of establishing a communication in the cordless telephone system and the cellular telephone system.

24. The method of claim 21, wherein said interference strength values are determined on the basis of the signal quality or the signal strength.

25. The method of claim 21, wherein said switching is performed in less than 50 ms.

26. The method of claim 21, wherein said processing is done in said first transceiver station.

27. The method of claim 21, wherein said interference data are interference flags that assume the value zero if the interference strength value on the associated channel is below a predetermined interference threshold, and assume a value of one if the interference strength value on the associated channel is above said predetermined interference threshold.

28. The method of claim 27, wherein said processing comprises an OR operation on said first and second interference flags associated with a unique channel pair, such that a decision flag is generated that assumes the value zero if both the first and second interference flags associated with the pair have the value zero, and assumes the value one otherwise.

29. The method of claim 28, wherein said processing comprises determining a weighted average value associated with a given channel pair on the basis of consecutive values of said decision flag associated with said given pair.

30. The method of claim 29, wherein the weights for newer values of said decision flag are larger than the weights for older values of said decision flag.

31. The method of claim 29, wherein said switching procedure is such that said first and second transceiver station switches from the current receiver channel to the channel having the lowest weighted average value.

32. The method of claim 29, furthermore comprising determining interference strength values for the channels of said group of candidate channels prior to said first transceiver station and second transceiver station switching to a new channel pair, where the order of said determinations of interference strength values is determined on the basis of the weighted average values, and where the first pair of channels for which one or both interference values lie below a predetermined first threshold is selected as a new channel pair.

33. The method of claim 28, wherein said group of candidate channels is determined on the basis of the weighted average values.

34. The method of claim 33, wherein said group contains those channels for which the associated weighted average is below a predetermined decision threshold.

35. The method of claim 21, wherein said one or more channel pairs other than the channel pair momentarily carrying the call are among a sub-set of all channel pairs available to said system for establishing call connections between said first and second transceiver station.

36. The method of claim 35, wherein said sub-set is defined at the time of call set-up on the basis of interference strength values determined during the idle phase of said first and second transceiver stations.

37. The method of claims 35, wherein, as said predetermined switching initiating condition, said switching procedure is performed at regular intervals.

38. The method of claim 35, wherein said first and second transceiver stations transmit in transmission blocks, and as said predetermined switching initiating condition, said switching procedure is performed each time that a predetermined number of transmission blocks has been transmitted.

39. A method of controlling a cordless telephone system comprising at least a first transceiver station and a second transceiver station, said system being arranged such that a given call connection is carried on a channel pair, said channel pair consisting of an uplink channel from said second transceiver station to said first transceiver station and a downlink channel from said first transceiver station to said second transceiver station, said method comprising the steps:

determining interference strength values during a call connection for one or more channel pairs other than the channel pair momentarily carrying the call connection, processing said interference strength values in order to determine a group of one or more candidate channel pairs that serve as candidate channel pairs to which a call connection can potentially be switched, during a call connection between said first and second transceiver station, under a predetermined switching initiating condition, performing a fast switching procedure from the channel pair momentarily carrying the call connection to a different channel pair from among said group of candidate channels, wherein, at a given time during a call connection to said second transceiver station, said first transceiver station also determines interference strength values for its momentary uplink channel, and is arranged to initiate said switching procedure if the determined interference strength values lie above a predetermined second threshold, as said predetermined switching initiating condition, and that at a given time during a call connection to said first transceiver station, said second transceiver station also determines interference strength values for its momentary downlink channel, and is arranged to initiate said switching procedure if the determined interference strength values lie above said predetermined second threshold, as said predetermined switching initiating condition.

40. A method of controlling a cordless telephone system comprising at least a first transceiver station and a second transceiver station, said system being arranged such that a given call connection is carried on a channel pair, said channel pair consisting of an uplink channel from said second transceiver station to said first transceiver station and a downlink channel from said first transceiver station to said second transceiver station, said method comprising the steps:

determining interference strength values during a call connection for one or more channel pairs other than the channel pair momentarily carrying the call connection, processing said interference strength values in order to determine a group of one or more candidate channel pairs that serve as candidate channel pairs to which a call connection can potentially be switched.

during a call connection between said first and second transceiver station, under a predetermined switching initiating condition, performing a fast switching procedure from the channel pair momentarily carrying the call connection to a different channel pair from among said group of candidate channels, wherein identification data associated with a predetermined number of receiver channels last used by said first and second transceiver stations is stored, and said predetermined number of channels last used is excluded from said group of candidate channels.

41. A cordless telephone system comprising at least a first transceiver station and a second transceiver station, said system being arranged such that a given call connection is carried on a channel pair, said channel pair consisting of an uplink channel from said second transceiver station to said first transceiver station and a downlink channel from said first transceiver station to said second transceiver station, said system furthermore comprising:

a channel pair switch for switching from a momentary call carrying channel pair to a new channel pair during a call connection, an interference strength determinator for determining interference strength values associated with one or more channel pairs that are available to said system for establishing call connections between said first and said second transceiver stations, said determinator being arranged to determine interference strength values during a call connection for one or more channel pairs other than the channel pair momentarily carrying the call connection, and a processor for processing said interference strength values in order to determine a group of one or more candidate channel pairs that serve as candidate channel pairs to which a call connection can potentially be switched, where said channel pair switch is arranged such that, during a call connection between said first and second transceiver station (FP, MS) under a predetermined switching initiating condition, said first and second transceiver stations (FP, MS) perform a fast switching procedure from the channel pair momentarily carrying the call connection to a different channel pair from among said group of candidate channels, wherein said first transceiver station is arranged to generate first interference data associated with the interference strength on each uplink channel for which a determination of interference strength values was performed, said second transceiver station is arranged to generate second interference data associated with the interference strength on each downlink channel for which a determination of interference strength values was performed, said processor is arranged to collate the first and second interference data, and to process said collated data in order to determine said group of candidate channels.

42. The cordless telephone system of claim 41, wherein said channel pairs available to said cordless telephone system overlap or coincide with channels used by a cellular telephone system distinct from said cordless telephone system, where the spatial transmission ranges covered by said cordless telephone system and said cellular telephone system overlap.

43. The cordless telephone system of claim 42, wherein said second transceiver station is a mobile station capable of establishing a communication in the cordless telephone system and the cellular telephone system.

44. The cordless telephone system of claim 41, wherein said interference strength values are determined on the basis of the signal quality or the signal strength.

45. The cordless telephone system of claim 41, wherein said system is arranged such that said fast switching is accomplished in less than 50 ms.

46. The cordless telephone system of claim 41, wherein said processor is provided in said first transceiver station.

47. The cordless telephone system of claim 41, wherein said interference data are interference flags that assume the value zero if the interference strength value on the associated channel is below a predetermined interference threshold, and assume a value of one if the interference strength value on the associated channel (i) is above said predetermined interference threshold.

48. The cordless telephone system of claim 47, wherein said processor performs an OR operation on said first and second interference flags associated with a unique channel pair, such that a decision flag is generated that assumes the value zero if both the first and second interference flags associated with the pair have the value zero, and assumes the value one otherwise.

49. The cordless telephone system of claim 48, wherein said processor is arranged to determine a weighted average value associated with a given channel pair on the basis of consecutive values of said decision flag associated with said given pair.

50. The cordless telephone system of claim 49, wherein the weights for newer values of said decision flag are larger than the weights for older values of said decision flag.

51. The cordless telephone system of claim 49, wherein said switching procedure is such that said first and second transceiver station switches from the current receiver channel to the channel having the lowest weighted average value.

52. The cordless telephone system of claim 49, wherein said system is furthermore arranged to determine interference strength values for the channels of said group of candidate channels prior to said first transceiver station and second transceiver station switching to a new channel pair, where the order of said determinations of interference strength values is determined on the basis of the weighted average values, and where the first pair of channels for which one or both interference values lie below a predetermined first threshold is selected as a new channel pair.

53. The cordless telephone system of claim 48, wherein said group of candidate channels is determined on the basis of the weighted average values.

54. The cordless telephone system of claim 53, wherein said group contains those channels for which the associated weighted average is below a predetermined decision threshold.

55. The cordless telephone system of claim 41, wherein said one or more channel pairs other than the channel pair momentarily carrying the call are among a sub-set of all channel pairs available to said system for establishing call connections between said first and second transceiver station.

56. The cordless telephone system of claim 55, wherein said sub-set is defined at the time of call set-up on the basis of interference strength values determined during the idle phase of said first and second transceiver stations.

57. The cordless telephone system of claim 55, wherein, as said predetermined switching initiating condition, said switching procedure is performed at regular intervals.

58. The cordless telephone system of claim 55, wherein said first and second transceiver stations transmit in transmission blocks, and as said predetermined switching initiating condition, said switching procedure is performed each time that a predetermined number of transmission blocks has been transmitted.

59. A cordless telephone system comprising at least a first transceiver station and a second transceiver station, said system being arranged such that a given call connection is carried on a channel pair, said channel pair consisting of an uplink channel from said second transceiver station to said first transceiver station and a downlink channel from said first transceiver station to said second transceiver station, said system furthermore comprising:

a channel pair switch for switching from a momentary call carrying channel pair to a new channel pair during a call connection, an interference strength determinator for determining interference strength values associated with one or more channel pairs that are available to said system for establishing call connections between said first and said second transceiver stations, said determinator being arranged to determine interference strength values during a call connection for one or more channel pairs other than the channel pair momentarily carrying the call connection, and a processor for processing said interference strength values in order to determine a group of one or more candidate channel pairs that serve as candidate channel pairs to which a call connection can potentially be switched, where said channel pair switch is arranged such that, during a call connection between said first and second transceiver station, under a predetermined switching initiating condition, said first and second transceiver stations perform a fast switching procedure from the channel pair momentarily carrying the call connection to a different channel pair from among said group of candidate channels, wherein said system is furthermore arranged such that at a given time during a call connection to said second transceiver station, said first transceiver station also determines interference strength values for its momentary uplink channel, and is arranged to initiate said switching procedure if the determined interference strength values lie above a predetermined second threshold, as said predetermined switching initiating condition, and said system is furthermore arranged such that at a given time during a call connection to said first transceiver station, said second transceiver station also determines interference strength values for its momentary downlink channel, and is arranged to initiate said switching procedure if the determined interference strength values lie above said predetermined second threshold, as said predetermined switching initiating condition.

60. A cordless telephone system comprising at least a first transceiver station and a second transceiver station, said system being arranged such that a given call connection is carried on a channel pair, said channel pair consisting of an uplink channel from said second transceiver station to said first transceiver station and a downlink channel from said first transceiver station to said second transceiver station, said system furthermore comprising:

a channel pair switch for switching from a momentary call carrying channel pair to a new channel pair during a call connection, an interference strength determinator for determining interference strength values associated with one or more channel pairs that are available to said system for establishing call connections between said first and said second transceiver stations, said determinator being arranged to determine interference strength values during a call connection for one or more channel pairs other than the channel pair momentarily carrying the call connection, and a processor for processing said interference strength values in order to determine a group of one or more candidate channel pairs that serve as candidate channel pairs to which a call connection can potentially be switched, where said channel pair switch is arranged such that, during a call connection between said first and second transceiver station, under a predetermined switching initiating condition, said first and second transceiver stations perform a fast switching procedure from the channel pair momentarily carrying the call connection to a different channel pair from among said group of candidate channels, wherein said system is furthermore arranged such that identification data associated with a predetermined number of receiver channels last used by said first and second transceiver stations is stored, and said predetermined number of channels last used is excluded from said group of candidate channels.

* * * * *